United States Patent
Shone et al.

(10) Patent No.: US 8,140,737 B2
(45) Date of Patent: Mar. 20, 2012

(54) METHOD FOR ENHANCING LIFE CYCLE OF MEMORY

(75) Inventors: Fuja Shone, Hsinchu (TW); Shih-Chieh Tai, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 682 days.

(21) Appl. No.: 11/668,469

(22) Filed: Jan. 30, 2007

(65) Prior Publication Data
US 2008/0183947 A1 Jul. 31, 2008

(51) Int. Cl.
*G06F 12/00* (2006.01)
(52) U.S. Cl. .................. 711/103; 711/E12.002
(58) Field of Classification Search ............ 711/103
See application file for complete search history.

(56) References Cited

U.S. PATENT DOCUMENTS

| | | | |
|---|---|---|---|
| 5,388,083 A * | 2/1995 | Assar et al. ............ 365/185.33 |
| 6,000,006 A * | 12/1999 | Bruce et al. ............ 711/103 |
| 6,732,221 B2 | 5/2004 | Ban | |
| 6,850,443 B2 | 2/2005 | Lofgren et al. | |
| 2002/0184432 A1 * | 12/2002 | Ban ............ 711/102 |
| 2005/0114589 A1 * | 5/2005 | Lofgren et al. ............ 711/103 |
| 2007/0233931 A1 * | 10/2007 | Tanaka et al. ............ 711/5 |

* cited by examiner

*Primary Examiner* — Reginald Bragdon
*Assistant Examiner* — Larry Mackall
(74) *Attorney, Agent, or Firm* — Winston Hsu; Scott Margo

(57) ABSTRACT

A hierarchical mechanism for preventing concentrated wear on single physical block or a specific set of physical blocks in the physical memory is proposed. The logical blocks mapping to the physical blocks in the physical memory are classified into two different levels for implicitly representing the modification times of the physical blocks. A modify count and a maximum modify count are further included for counting the modification times in a single process of the hierarchical mechanism and for limiting the modification times in single process, leading to the probabilities of all the physical blocks being modified in the physical memory being balanced. The breakdown of the physical memory caused by the breakdown of a specific set of physical blocks or single physical block is thus prevented.

4 Claims, 12 Drawing Sheets

METHOD FOR ENHANCING LIFE CYCLE OF MEMORY

BACKGROUND OF THE INVENTION

1. Field of the Invention

The present invention relates to a method for enhancing a life cycle of memory, more specifically to a method for enhancing a life cycle of memory by setting a level for each data block.

2. Description of the Prior Art

In an electronic device equipped with a flash memory control card, there are several blocks, each of which includes several pages, for writing and erasing data stored in a flash memory of said flash memory control card. Data is stored in majority of a said page whereas related control information of said page is stored in remainder of said page. For example, in a first conventional flash memory, a block contains 64 pages, each of which occupies 2048 bytes for data plus 64 bytes for said control information. In a second conventional flash memory, a block contains 32 pages, each of which includes 512 bytes for data plus 16 bytes for said control information.

Please refer to FIG. 1, FIG. 2, FIG. 3, FIG. 4, and FIG. 5, which are diagrams for illustrating block operations in a flash memory of a conventional flash memory controller. A PBA Block #n stores pages, as shown in FIG. 1, for various logical pages of a plurality of logical blocks. In FIG. 1, another free block PBA Block #m is retrieved from a free queue. In FIG. 2, two pages PBA Page #0 and PBA Page #1, each of which includes data, are copied from the physical block PBA Block #n to the free block PBA Block #m. In FIG. 3, a host writes new data into the free block PBA Block #m at the page PBA Page #2. In FIG. 4, data stored at the pages from PBA Page #3 to PBA Page #31 of the physical block PBA Block #n is written into the free block PBA Block #m at the pages from PBA Page #3 to PBA Page #31. In FIG. 5, at last, all data stored in the physical block PBA Block #n is erased so that the physical block PBA Block #n becomes a new free block for returning to the free queue.

As described above, while executing the abovementioned procedure, each physical block is often erased or written for updating at least one logical page. However, repeatedly writing or erasing to a same physical block for a few logical pages always wears the availability of said same physical block.

Note that in the abovementioned procedure, logical pages of a logical block occupy consecutive logical addresses. However, two logical pages occupying two consecutive logical addresses always occupy two separate physical addresses, both of which are always in different physical blocks. Therefore, updating data in a plurality of logical pages occupying consecutive logical address of a logical block always results in updating a large plurality of physical pages, which are respectively located at different physical blocks (some of the physical pages may be located at a same physical block). For updating large amount of logical pages, a same physical block may have to be updated much frequently because of updating a large plurality of related logical pages, and an availability of said same physical block is worn significantly for the noted reason.

Among available algorithms utilized by common flash controllers, a specific set of physical blocks in the physical memory is frequently written or erased with a higher probability than the other physical blocks in the physical memory, as discussed above. Therefore, after a significant amount of updates on a specific physical block, a write disturbance easily happens to the specific physical block with a high probability of being written and the specific physical block may not be accessed or updated by the host anymore in a hardware aspect. It represents that the life cycle of the specific physical block is thus over.

While such write disturbances accumulate on the physical memory, the availability and the life cycle of the physical memory decreases significantly. Eventually individual disturbances may cause a whole breakdown of the physical memory. The physical memory thus has to be replaced while a lot of physical blocks in the physical memory are still available.

A technique called wear leveling has been proposed for easing such situations. Note that the following diagrams are illustrated in views of blocks, whereas the diagrams from FIG. 1 to FIG. 5 are illustrated in views of pages, for clearer explains. Please refer to FIG. 6, which is a schematic diagram of a prior art wear leveling method. A physical memory includes a plurality of physical blocks. Some physical blocks are mapped to by another plurality of logical blocks while other physical blocks not mapped to by any logical blocks are regarded as free blocks. A corresponding erase count field is disposed along with each of the physical blocks in the physical memory for recording a corresponding number of times that physical block has been modified. As an example, in FIG. 1, the physical memory block notated as "0" is a "Free Block" that has been modified 15235 times. A free queue is utilized for storing corresponding links or pointers of the free blocks and for facilitating the management of the free blocks. The strategy of the prior art wear leveling method is described as follows.

Referring to FIG. 6, every time when a host updates a logical block, or when the host updates at least one logical page in said logical block, a physical block having the smallest modify count excluding the free blocks is chosen for storing the updated data in the logical block. LBA Block #1 is therefore chosen to store the updated data. A free block indicated by the front terminal of the free queue is also retrieved for storing the original data stored in the physical block to be updated. Thus, the free block at memory location "0" is retrieved. First, the retrieved free block stores the original data stored in the physical block to be updated and then the physical block to be updated is erased. At this time, a swap between the free block and the physical block has been completed. The erased physical block is then utilized for storing the updated data in the logical block. The modify count of the updated physical block is also increased by 1 for representing that the physical block has been modified one more time by swapping with the free block. Increasing the modify count by 1 corresponds to a swap between the physical block and the free block.

As time goes on, a physical block having the smallest modify count excluding the free blocks is always the first physical block to be erased and updated in the physical memory, preventing modifications from concentrating in a specific physical block or in a specific set of physical blocks. However, every time when a physical block having the smallest modify count is searched and chosen, it is necessary to scan the whole physical memory to determine the modify counts of the physical blocks mapped by the logical blocks in the physical memory, and the performance impact on the physical memory is thus huge. Bits for storing the modify counts of the physical blocks are also numerous, for example, it takes at least 16 or 17 bits for storing the modify counts as shown in FIG. 6 since 2 to the $15^{th}$ power equals 32768 and a sign bit is also required for storing the modify counts. Moreover, although the method prevents modifications concentrating in a specific physical block or in a specific set of physical blocks, the probabilities of the physical blocks being modified still vary a lot since when a physical block having the smallest modify count is chosen, the free blocks are not taken into consideration even though the modify counts of the free blocks may be significantly higher or lower.

SUMMARY OF THE INVENTION

The claimed invention provides a method for enhancing a life cycle of memory that includes updating content of a data block and moving the data block to a free block, updating a level of the data block and updating a modify count of the memory in response to the movement of the data block when the modify count does not reach a predetermined value, when the modify count reaches the predetermined value, updating the level of remaining data blocks whose level is different from other data blocks' level and moving the remaining data blocks to free blocks without updating contents of the remaining data blocks, and when all data blocks reach a same level, resetting the modify count.

These and other objectives of the present invention will no doubt become obvious to those of ordinary skill in the art after reading the following detailed description of the preferred embodiment that is illustrated in the various figures and drawings.

DETAILED DESCRIPTION

The present invention provides an advanced wear leveling method for balancing the number of times of each physical block in the memory is accessed. Therefore, the probability of each physical block being accessed is balanced.

Figure 1:
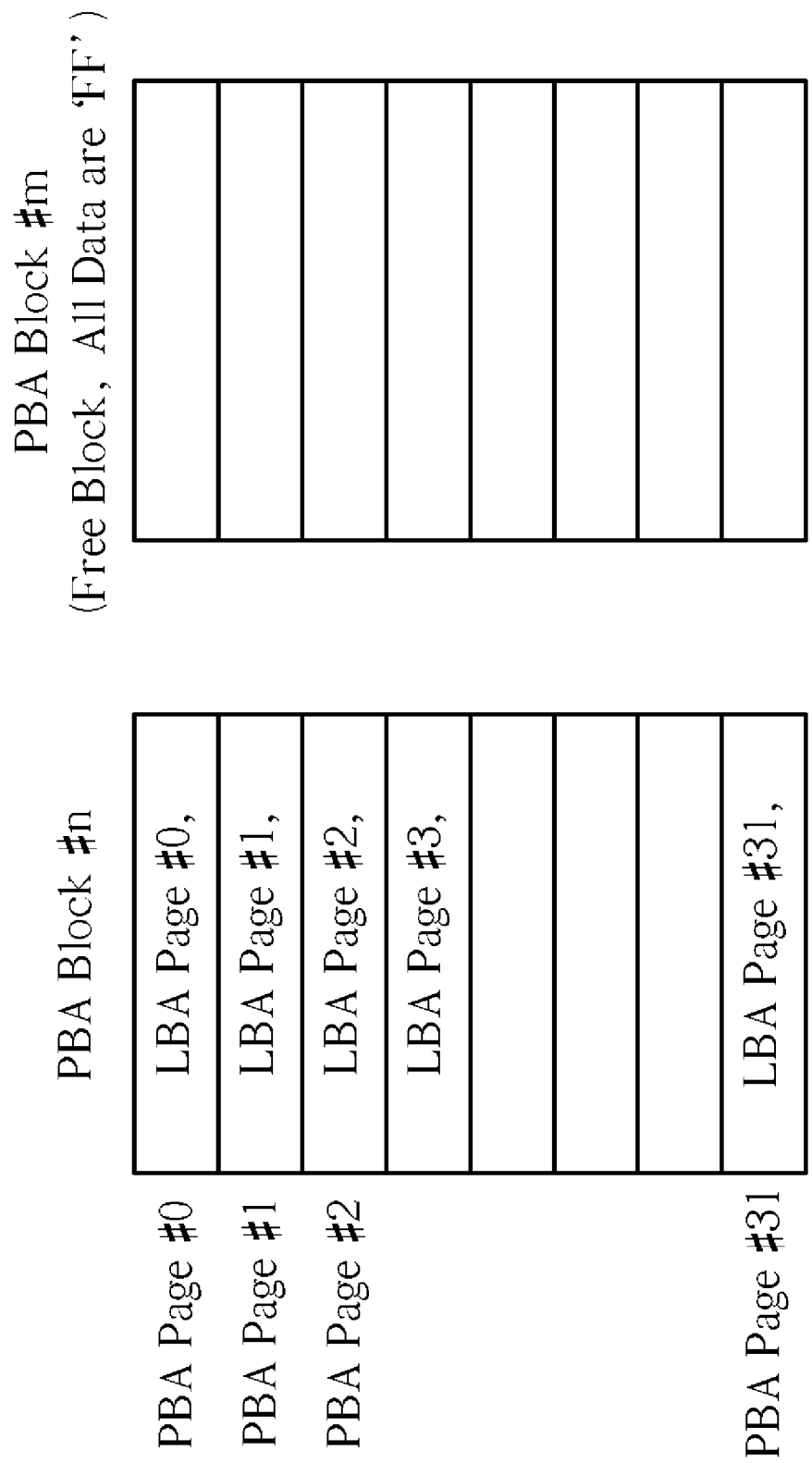
FIG. 1, FIG. 2, FIG. 3, FIG. 4, and FIG. 5 are diagrams for illustrating block operations in a flash memory of a conventional flash memory controller.
Figure 2:
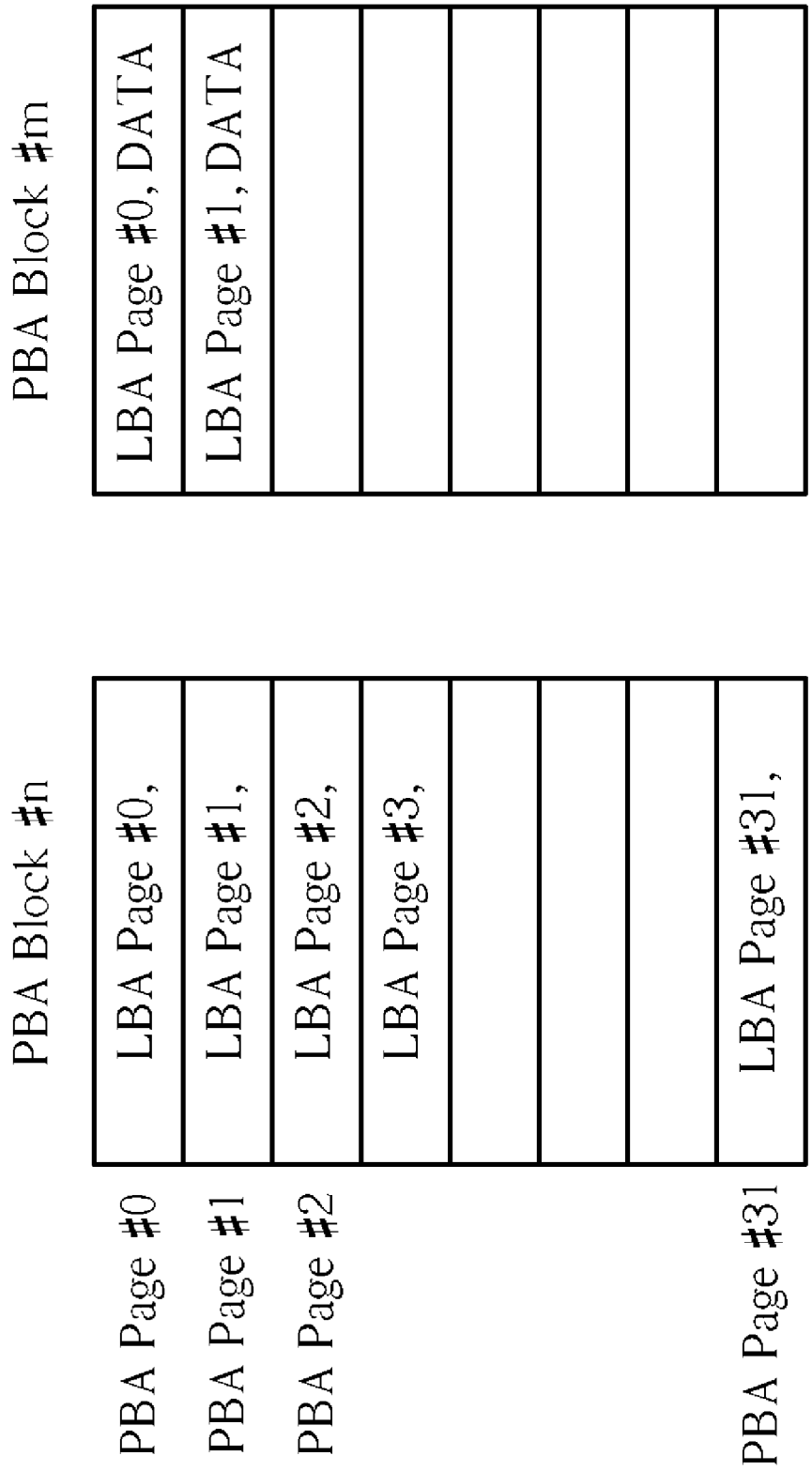
Figure 3:
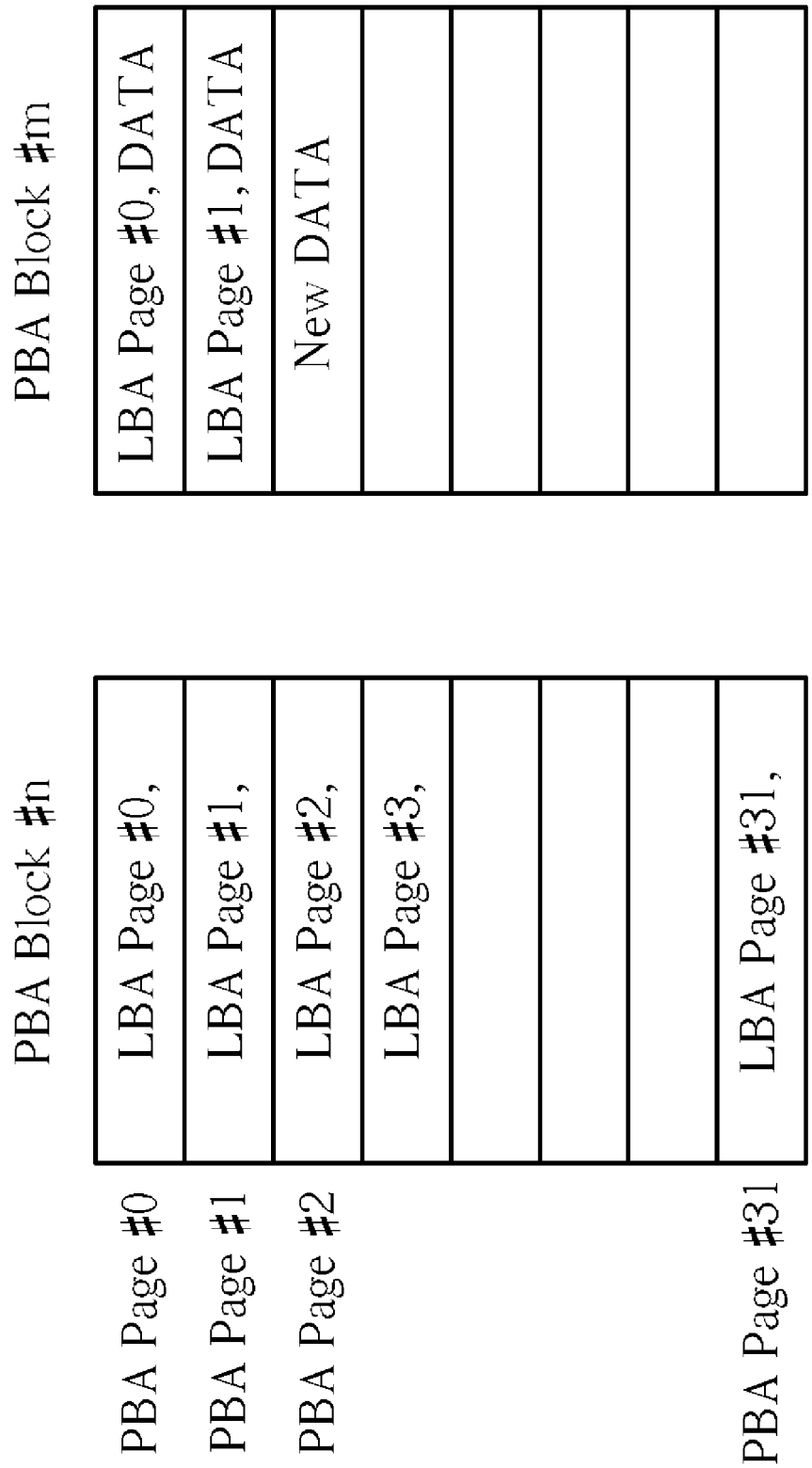
Figure 4:
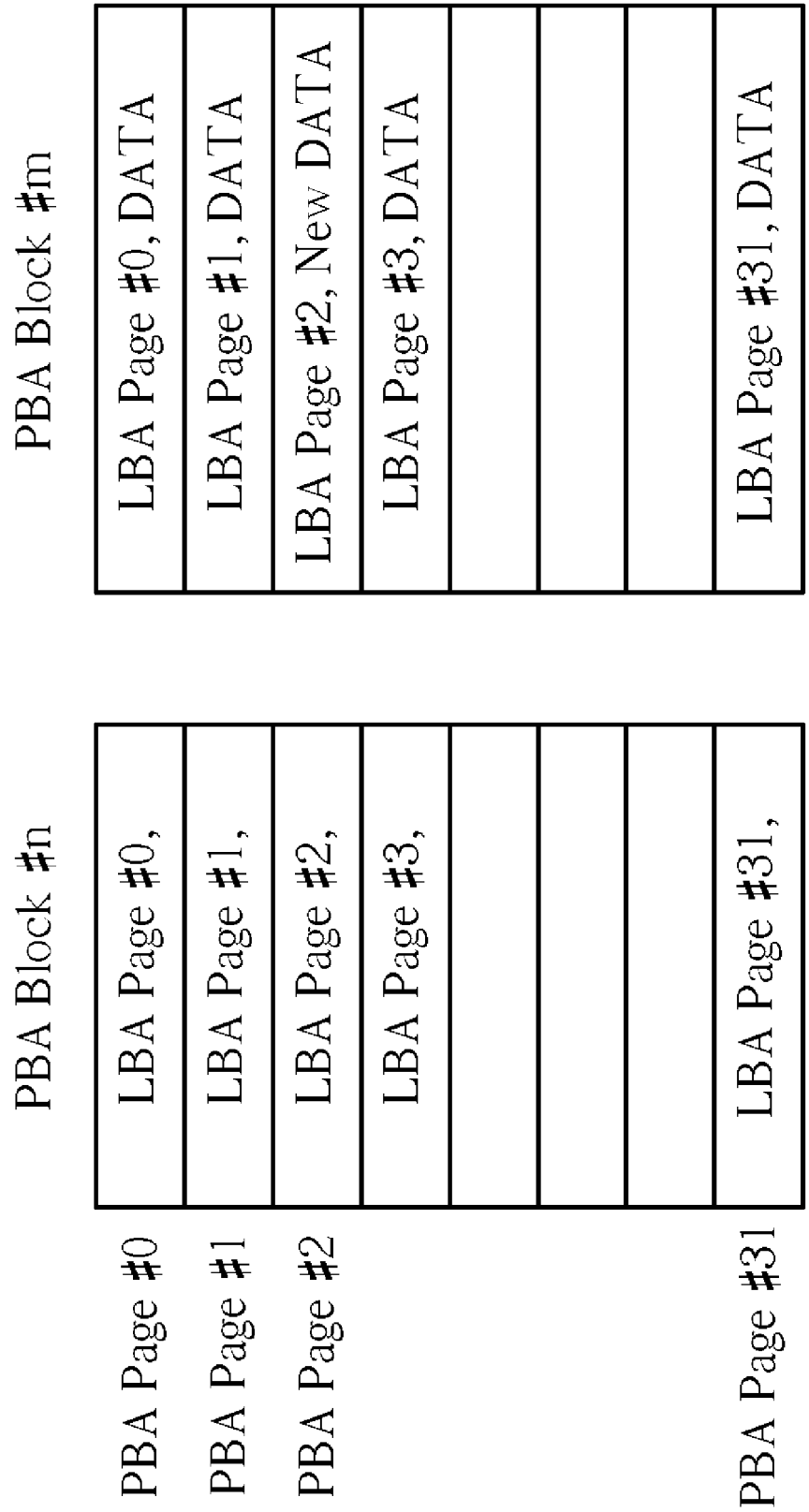
Figure 5:
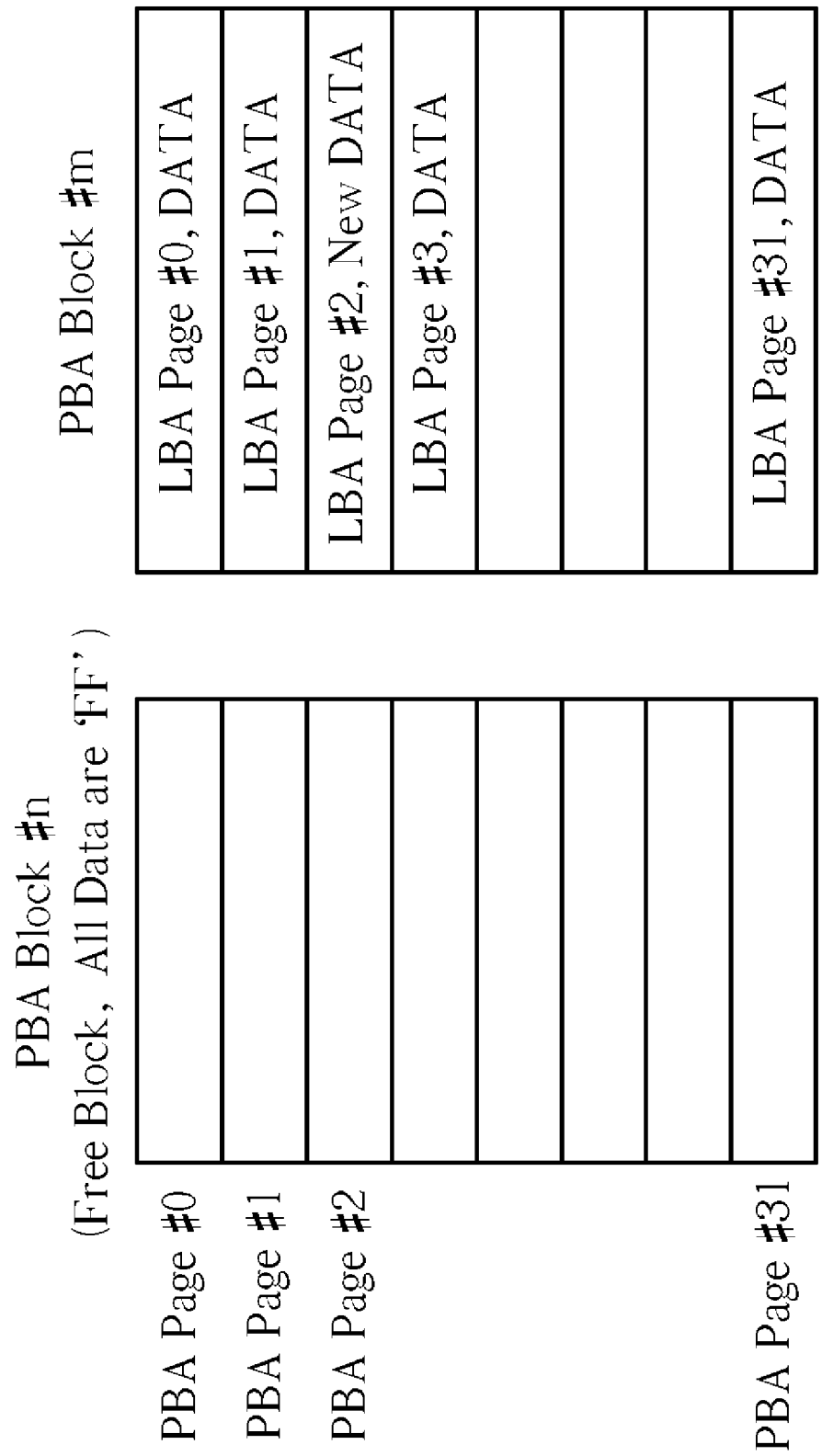
Figure 6:
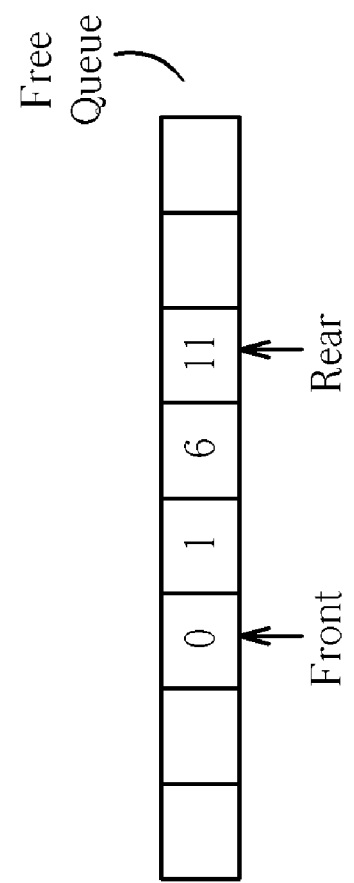
FIG. 6 is a schematic diagram of a prior art wear leveling method.
Figure 7:
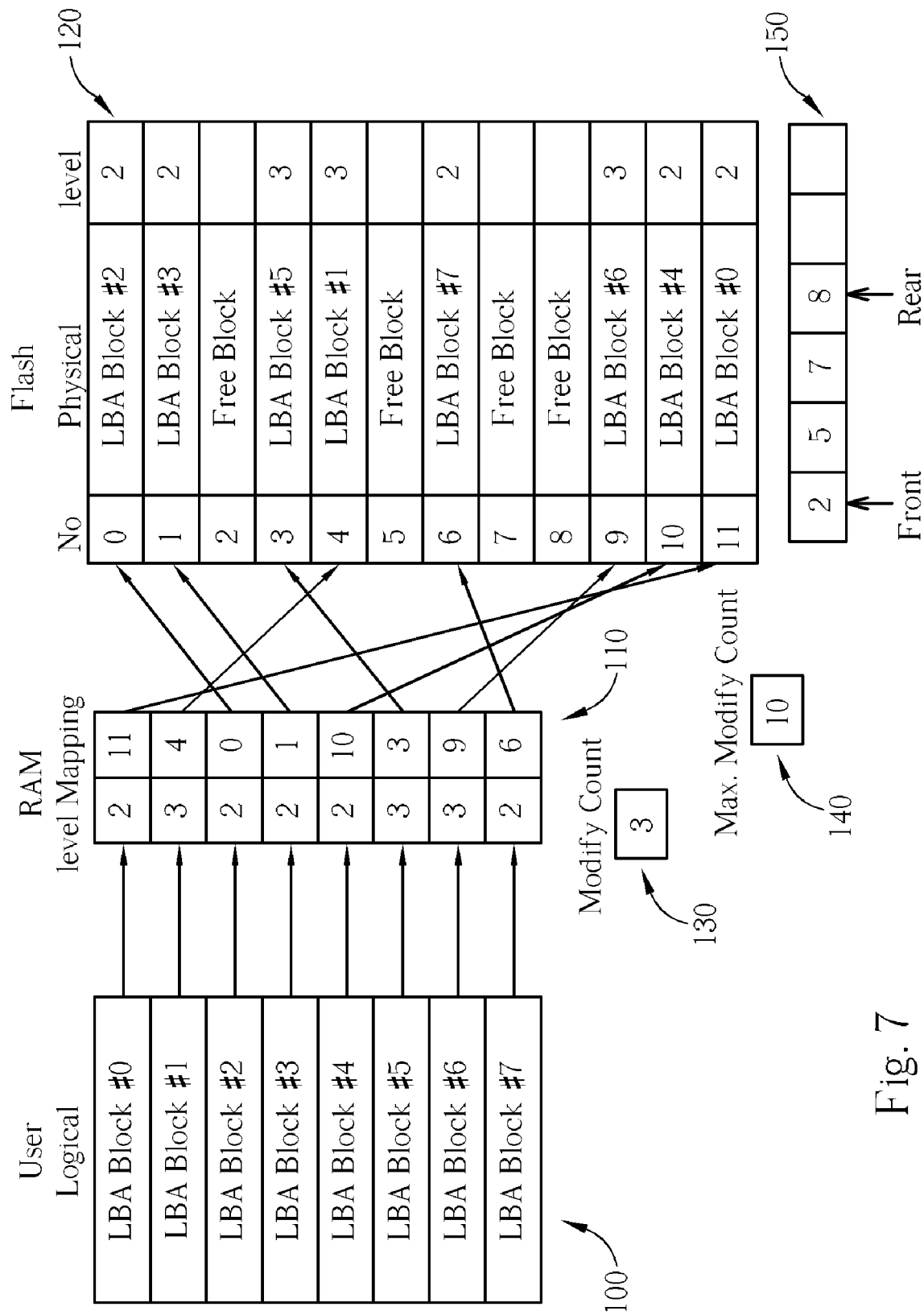
FIG. 7, FIG. 8, FIG. 9, FIG. 10, and FIG. 11 are diagrams showing the steps of the present invention.

Please refer to FIG. 7, FIG. 8, FIG. 9, FIG. 10, and FIG. 11, which are diagrams showing the steps of the present invention. In FIG. 7, a logical memory 100 includes a plurality of logical blocks LBA Block #0, LBA Block #1, LBA Block #2, LBA Block #3, LBA Block #4, LBA Block #5, LBA Block #6, and LBA Block #7. A physical memory 120, which may be a form of flash memory, includes a plurality of physical blocks from the $1^{st}$ physical block, which is denoted as No.0 in FIG. 7, to the $12^{th}$ physical block, which is denoted as No.11 in FIG. 7. As shown in FIG. 7, the logical blocks in the logical memory 100 are mapped into some physical blocks of the physical memory 120. The mappings from the logical memory 100 to the physical memory 120 are stored in a mapping table 110. Each of the physical blocks not mapped to by a logical block is denoted as a free block. For example, the logical memory 100 LBA Block #0 is mapped to the physical memory 120 block No.11 by the mapping table 110. Block No. 2 in the physical memory is not currently mapped to and is considered a Free Block.

In FIG. 7, the logical blocks mapped into the physical memory 120 are grouped into a first level and a second level. The levels corresponding to the logical blocks are also stored along with the mappings in the mapping table 110. The levels are stored in bits, and in a preferred embodiment of the present invention, it takes at most 2 bits for storing a level, but obviously this size may be subject to design considerations. A higher level represents that a corresponding logical block has been modified or swapped, for example, an erase instruction or a write instruction in a swap between a swapped physical block and a free block, one more time than other logical blocks having a lower level.

Additionally, a field denoted as a modify count 130 is utilized for recording the total number of modifications in the logical memory 100. Another field denoted as a maximum modify count 140 is utilized to record a maxim number of modifications for the logical memory 100. When the maxim number of modifications is exceeded by the value of the modify count, further instructions are executed and explained latter.

Furthermore, a free queue 150 is also utilized for recording references to the free blocks in the physical memory 120, and is implemented with a general queue structure including front and rear pointers. The free queue 150 shown in FIG. 7 and the following diagrams simply store the corresponding numbers of the free blocks in the physical memory 120, however, since the free queue 150 is implemented with a general queue structure in data structure, the method for storing references of the free blocks and the size of the free queue are both not limited to FIG. 7 and the following diagrams in the present invention.

The method of the present invention is executed as repeating processes. While the host is running the repeating processes, data of a logical block is erased or written with respect to swaps between the swapped physical blocks and the free blocks in the physical memory, and the data of the physical block mapped by the logical block is thus also erased or written with respect to the swaps. Previously, if a specific logical block is modified in an extreme higher frequency than other logical blocks, the physical block mapped by the logical block is also erased or written (or swapped) in an extreme higher frequency than other physical blocks, and the life cycle of the physical block is thereby significantly less than the other physical blocks. The method of the present invention is primarily utilized for overcoming such situations.

Figure 8:
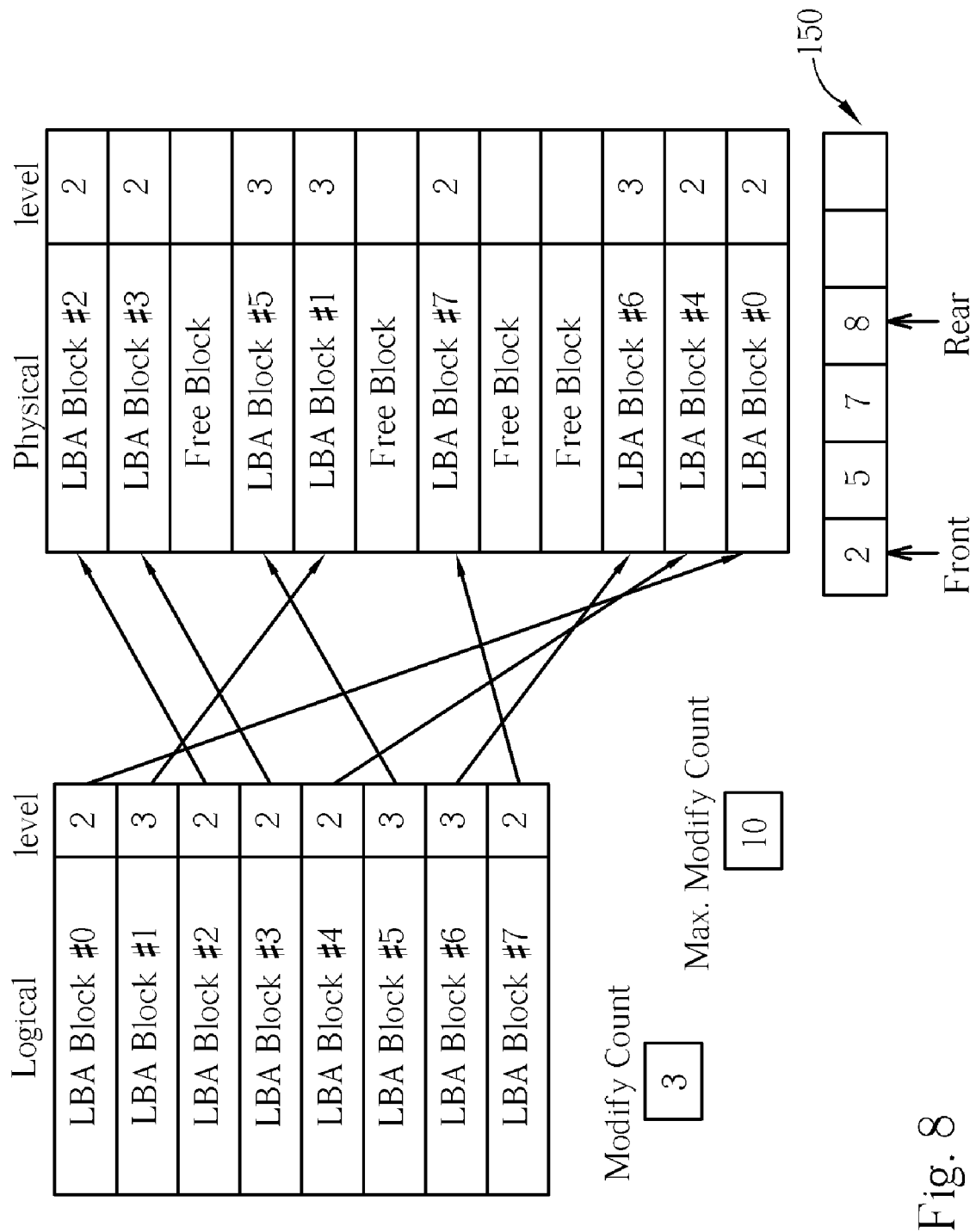

In FIG. 8 and the following diagrams, the mapping table 110 is still utilized but has been omitted from the drawings merely to focus on the critical aspects of the present invention. Essential to understand of the invention, the levels of the logical blocks are shown along with the logical blocks. During a single example process, the modify count field 130 is assumed to be 3 currently and the maximum modify count field 140 is assumed to be 10 in the single process of the present invention. It means the value of the maximum modify count field 140 may be updated in different processes according to a current requirement corresponding to various processes.

Figure 9:
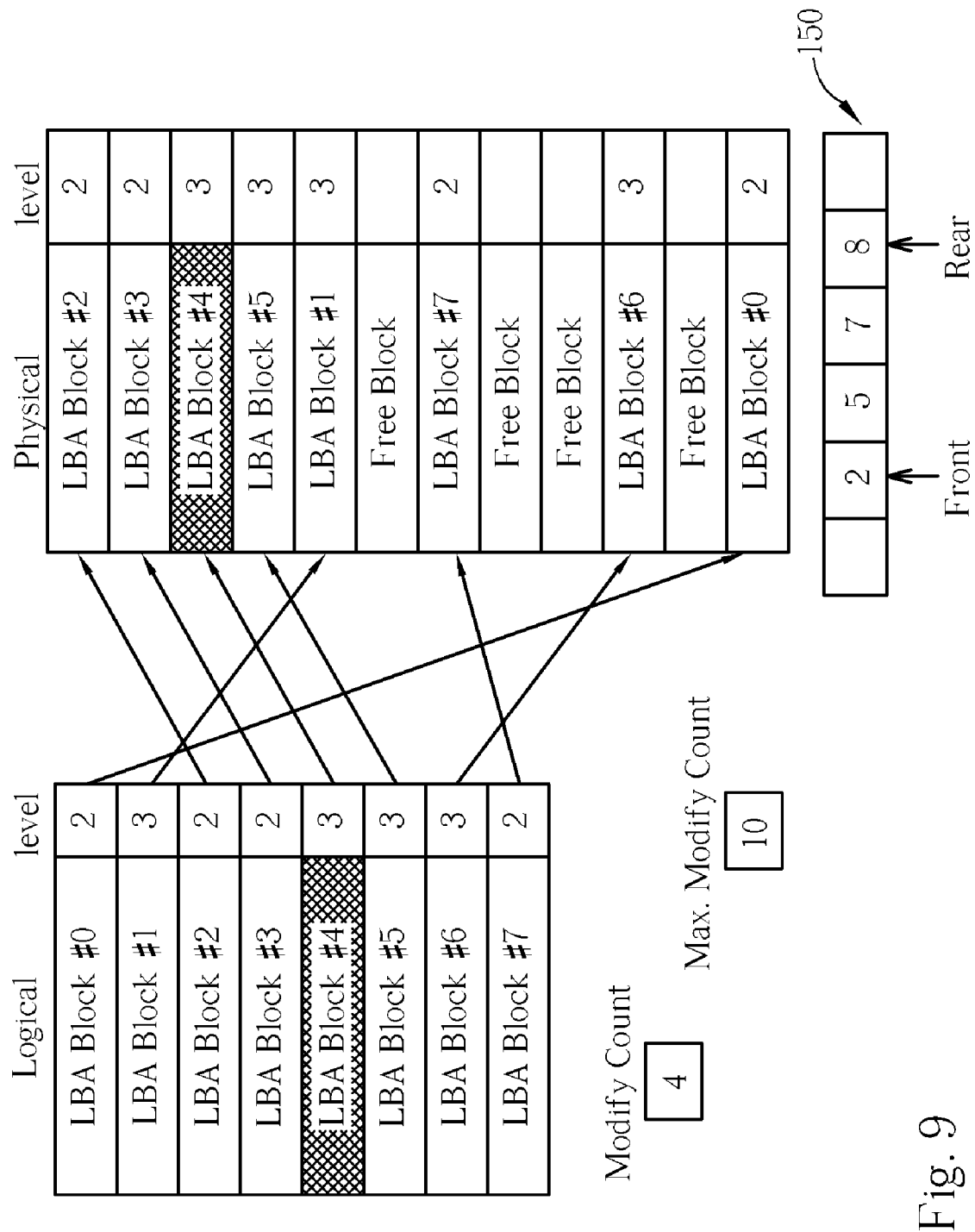

When the host modifies the logical block LBA Block #4, whose level is 2 before the modification as seen in FIG. 8, the level of the logical block LBA Block #4 is increased to be 3 as seen in FIG. 9 for representing that the logical block LBA Block #4 has been modified one more time. The modification of the level is recorded with the logical block LBA Block #4. The modify count field 130 is also modified from 3 to 4 for representing that the logical memory 100 has been modified one more time. In the physical memory, the physical block previously mapped by the logical block LBA Block #4 as seen in FIG. 8 is also swapped with a free block from the front queue, which is the $3^{rd}$ physical block in the physical memory 120. The result of the swap can be seen in FIG. 9. The free queue 150 is also updated to remove what was before the swap of the free block from the front queue and to insert the post-swap, newly freed block previously storing LBA Block #4 into the free queue 150. Note that the increase of the level of the logical block physically corresponds to a swap between the swapped physical block and the free block from the front queue in the physical memory 120.

Figure 10:
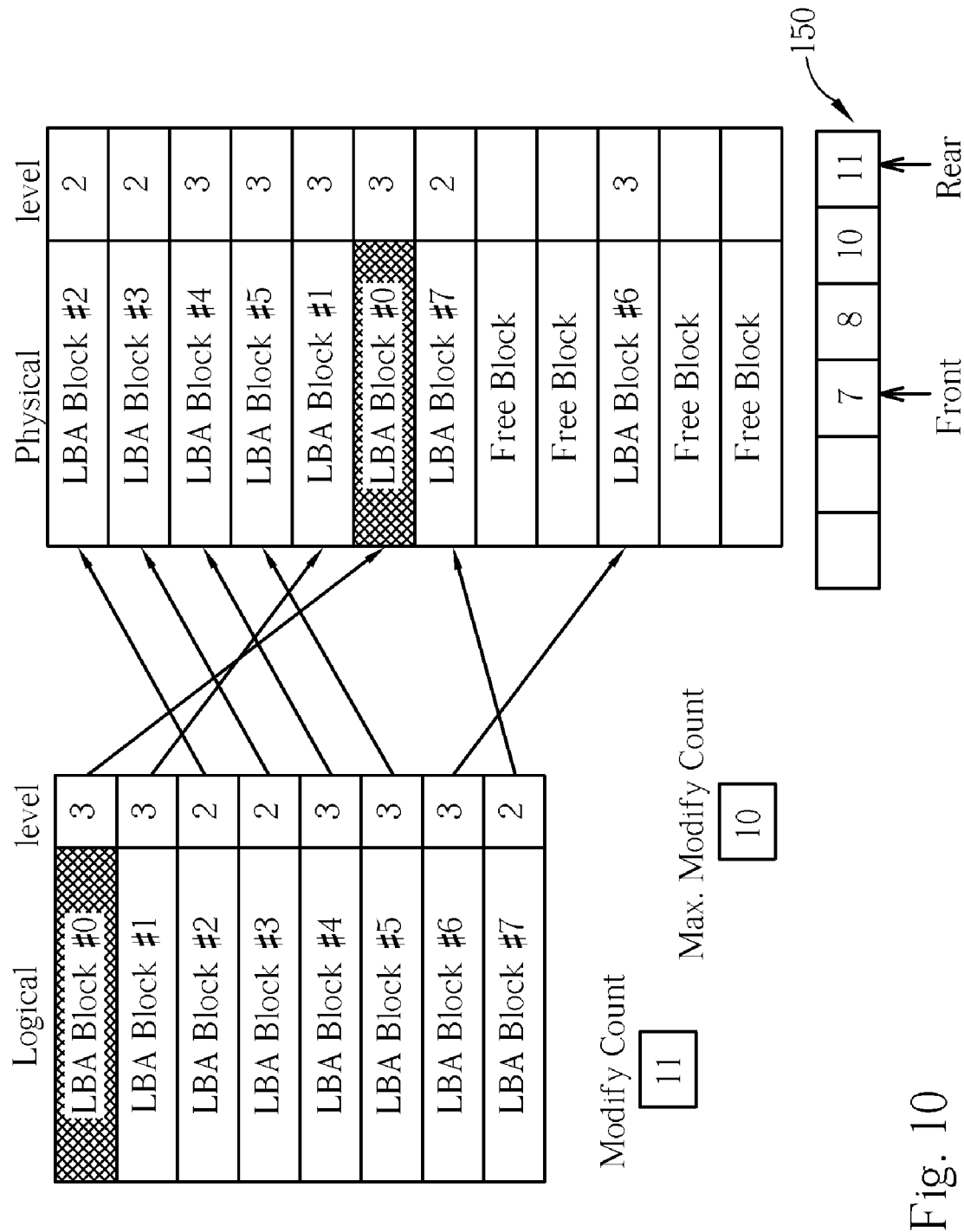

Assume that in another process other than the process shown in FIG. 7, FIG. 8, and FIG. 9, the circumstances become as shown in FIG. 10. In FIG. 10, the modify count field 130 is previously 10 and reaches the value of the maximum modify count 140, i.e., 10. The logical block LBA block #0 is assumed to be modified, thereby, the value of the modify count field 130 has been increased from 10 to 11 and exceeds the value of the maximum modify count 140. In the physical memory 120, the $12^{th}$ physical block originally mapped by the logical block LBA block #0 is swapped with a free block from the front queue as shown in FIG. 9, which is the $6^{th}$ physical block in the physical memory 120 with the result shown in FIG. 10. Therefore, the level of the logical block LBA Block #0 is also modified from 2 to 3 with respect to the swap between the $12^{th}$ physical block and the free block from the front queue in the physical memory 120. At this time, since the modify count field 130 having the value 111 has exceeded the maximum modify count field 140 having the value 10, in FIG. 11, the modifications of the single process have to be suspended, and the single process in the logical memory 100 is going to end for repetitively starting a new process for new modifications.

Figure 11:
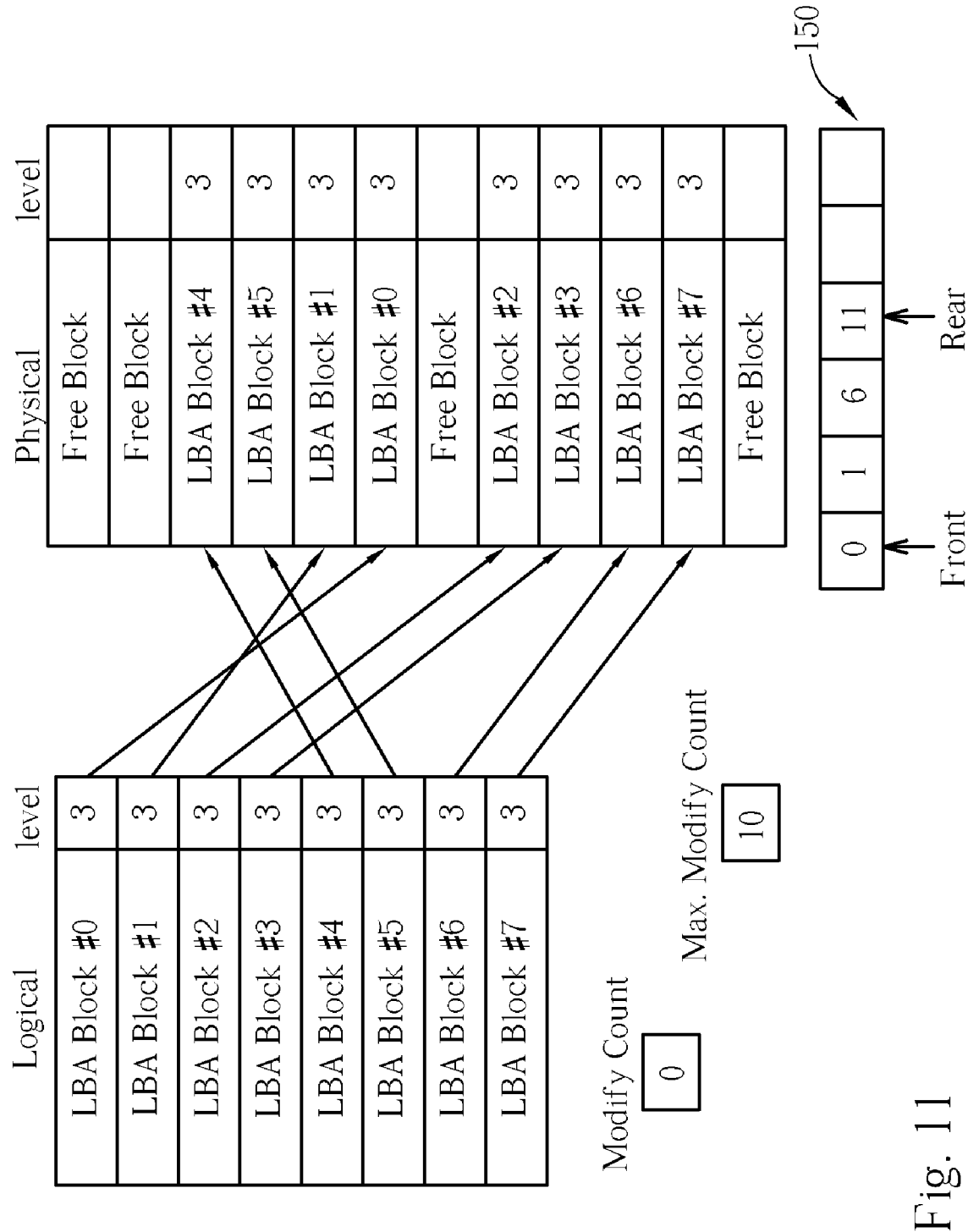

Each of the physical blocks mapped by the logical blocks having the level 2 is swapped with a free block from the front queue lower than the current physical block in the physical memory 120, and the level of each of the physical blocks is modified to 3 with respect to the swaps. For example, please refer to FIG. 10 and FIG. 11, the $1^{st}$ physical block previously mapped by the logical block LBA Block #2 is swapped with a free block from the front queue, which is the $8^{th}$ block in the physical memory 120, then the $2^{nd}$ physical block previously mapped by the logical block LBA Block #3 is swapped with the free block from the front queue lower than the current physical block, which is the $9^{th}$ physical block in the physical memory 120, and finally the $7^{th}$ physical block previously mapped by the logical block LBA block #7 is swapped with a free block from the front queue lower than the current physical block, which is the $11^{th}$ physical block in the physical memory 120. Therefore, after the swaps, the free queue 150 and the physical memory 120 become as shown in FIG. 11.

The levels of all the physical blocks are all 3 at this time by the swaps, and it means that the levels of all the physical blocks are all the same now. Then the modify count field 130 is reset to be 0 for a next single process, and the levels of all logical blocks are increased by 1 again. Note that in a preferred embodiment of the present invention, the levels of the logical blocks are stored in 2 bits. Therefore, without considering sign or the carry of a binary number, the increased levels are all 0 at this time since "11", which represents decimal 3, increased by 1 equals "00", which represents decimal 0. And the next process of level 0 thus begins. Such processes are executed repeatedly as mentioned above.

Note that the levels associated with each logical block are merely a form of modification flags for recognizing whether logical blocks have been modified in the current recursion. Therefore, in its simplest form, a preferred embodiment of the present invention utilizes a one-bit modification flag for each logical block representing whether that logical block has been modified in the current recursion. All modification flags are cleared before beginning a new process.

A physical block of the physical memory 120 is worn a little each time when the data stored in the corresponding logical block is modified or swapped, and the accumulation of such wears leads to a breakdown of the physical block, even a breakdown in the whole physical memory 120. In the method of the present invention, such wears are balanced among all the physical blocks in the physical memory 120 during a single process.

As mentioned above, when the data stored in the logical block LBA Block #4 is modified, the data stored in the physical block mapped to by the logical block LBA Block #4 is also modified. Then the physical block located as the $11^{th}$ physical block in the physical memory 120 is swapped with a free block from the front queue and located at the $3^{rd}$ physical block in the physical memory 120 as shown in FIG. 8 and FIG. 9. Before the end of the single process, i.e. before the modify count field 130 is increased to 11, the $11^{th}$ physical block, which is currently a free block in the physical memory 120 shown in FIG. 10, is modified again with a extremely low probability since there are still free blocks in front of the $11^{th}$ physical block such as the $6^{th}$, the $8^{th}$, and the $9^{th}$ physical blocks shown in FIG. 9. Even if the logical block LBA Block #4 is modified again before the single process ends, the $6^{th}$ physical block would be the first free block to be modified instead of the $3^{rd}$ physical block mapped by the logical block LBA Block #4. As the single process goes before it ends, repeated modification of a single physical block is unlikely to happen as long as there are enough free blocks for swapping in the physical memory 120. The probability of each of the physical blocks in the physical memory 120 being modified in a single process almost converges to be the same probability. Therefore, wears will not be concentrated at a same physical block or a specific set of physical blocks in the physical memory. Whole breakdown of the physical memory 120 caused by breakdown of single physical block or a specific set of physical blocks is thus prevented also.

Figure 12:
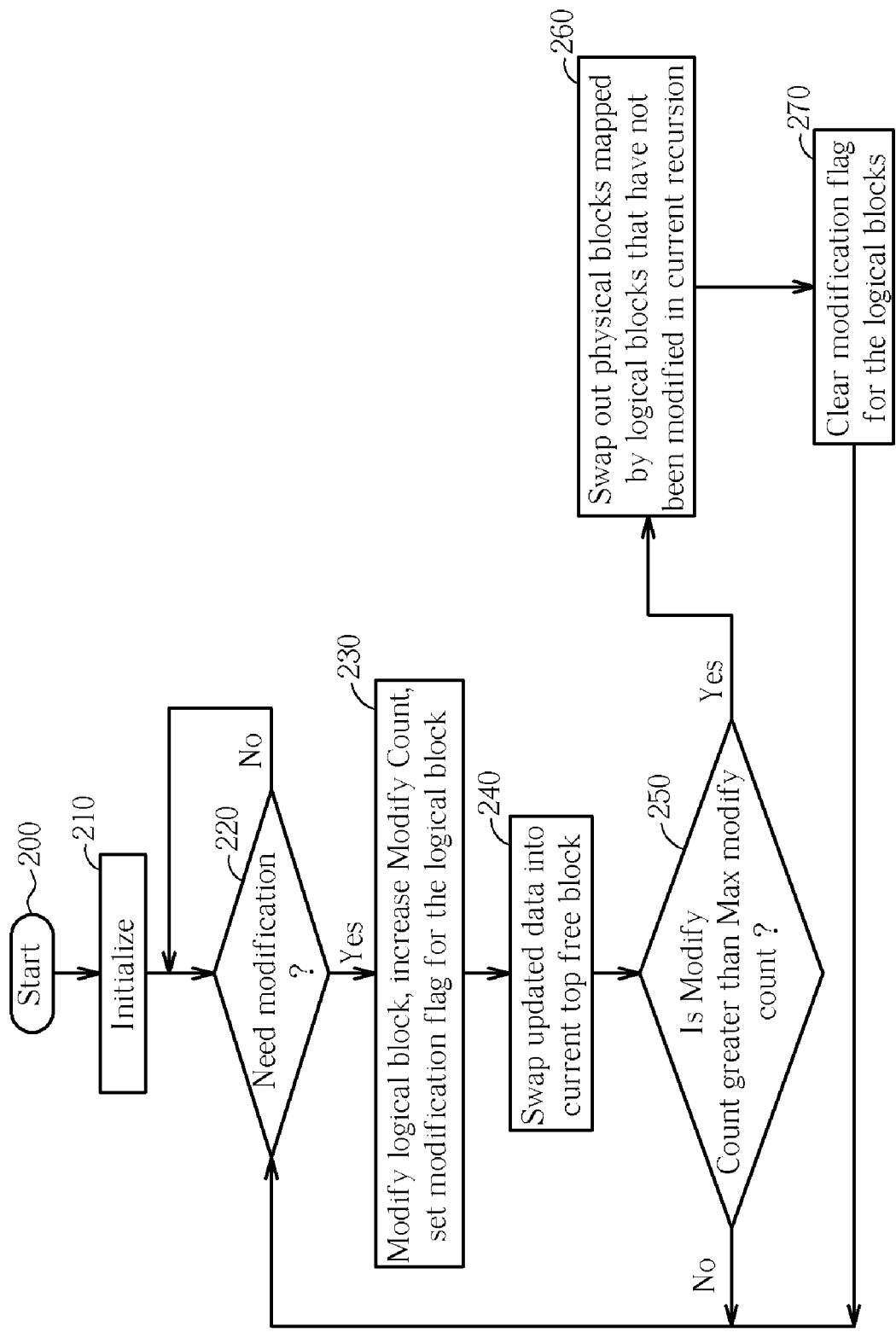
FIG. 12 is a flow chart of the method of the present invention.

Please refer to FIG. 12, which is a flow chart of the method of the present invention during single process. The method summarizing the aforementioned process as follows:

Step 200: Start.

Step 210: Initialize the logical blocks and the physical blocks.

Step 220: Check whether a logical block requires modification. If NO, go to Step 220, else go to Step 230.

Step 230: Modify the logical block, increase Modify Count, and set the modify count or flag for the logical block.

Step 240: Swap updated data into a current free block.

Step 250: Check if Modify Count is greater than Maximum Modify Count? If NO, go to Step 220. If YES, go to Step 260.

Step 260: Swap out physical blocks mapped by logical blocks that have not been modified in current recursion.

Step 270: Clear modification flags for the logical blocks. Go to Step 220.

In Step 210, the logical blocks and the physical blocks are initialized for latter processing. If necessary, the initialization can also include inserting appropriate values into the mapping table, assigning initial level values, etc. In Step 230, the modification flag is just the level mentioned before. In Step 260, the modification flags of the logical blocks are checked. All physical blocks mapped by logical blocks having an unmodified level are swapped with free blocks in the free queue in priority order of the free queue. In Step 270, the modification flags are cleared for a next-time recursion. Note that in this paper, Steps 220-250 are considered a single process, which is repeated until Step 260 is reached.

The present invention provides a hierarchical method for balancing the access times of each physical block in the physical memory such as flash memory. By the hierarchical structure comprising the levels and the modify counts of the logical memory, the bits utilized for implementing the method are much less than the bits utilized by the prior art method. Moreover, since only the physical blocks mapped by the logical blocks having a lower level than the other logical blocks in the logical memory have to be searched, the complexity of searching a physical block to be swapped is much less than the prior art method. Last, since choosing the physical block to be swapped merely depends on the levels of the logical blocks, the probability of each of the physical blocks in the physical memory being erased or written (or swapped) is more easily balanced than the prior art method.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for enhancing a life cycle of memory comprising:

after all logical data blocks of the memory are at a first level, updating a content of a logical data block and moving the content of the logical data block from a first physical block of the memory to a free physical data block of the memory;

updating a level of the logical data block from the first level to a second level and updating a modify count of the memory in response to the movement from the first physical block to the free physical data block when the modify count has not reached a predetermined value, wherein the second level indicates at least one more modification on the logical data block than the first level, and the modify count of the memory indicates a sum of modifications on all the logical data blocks of the memory between a transition from the first level and the second level of all the logical data blocks of the memory;

when the modify count reaches the predetermined value, updating the level of only remaining logical data blocks which have not been modified between the transition from the first level to the second level and moving contents stored in physical blocks corresponding to the remaining logical data blocks to current free physical data blocks of the memory without updating the contents of the remaining logical data blocks; and when all the logical data blocks of the memory reach the second level, resetting the modify count.

2. The method of claim 1 wherein updating the level of only the remaining logical data blocks comprises continuing updating the level of the remaining logical data blocks until the second level is reached for all the logical data blocks of the memory.

3. The method of claim 1 wherein updating the level of the logical data block from the first level to the second level and updating the modify count of the memory in response to the movement from the first physical data block to the free physical data block when the modify count has not reached the predetermined value comprises continuing increasing the level of all the logical data blocks of the memory until the second level is reached for all the logical data blocks of the memory and increasing the modify count of the memory in response to the movement from each physical data block to each current free physical data block when the modify count is smaller than the predetermined value.

4. The method of claim 1 wherein updating the content of the logical data block and moving the content of the logical data block from the first physical block of the memory to the free physical data block of the memory comprises:

modifying a content in a logical data block to generate a modified logical data block;

associating a free physical data block, to which the contents of the logical data block will be moved, with the modified logical data block;

storing the modified content in the associated free physical data block; and if the modify count is greater than a predetermined value, moving a content of a physical data block of the memory associated with an unmodified logical block to a current free physical data block of the memory.

* * * * *